United States Patent
O'Connor

(10) Patent No.: US 9,367,258 B2
(45) Date of Patent: Jun. 14, 2016

(54) SYSTEMS AND METHODS FOR MANAGING STORAGE SPACE IN HYBRID DATA STORAGE SYSTEMS

(71) Applicant: Lawrence O'Connor, Austin, TX (US)

(72) Inventor: Lawrence O'Connor, Austin, TX (US)

(73) Assignee: New Concepts Development Corp., Woodstock, IL (US)

( * ) Notice: Subject to any disclaimer, the term of this patent is extended or adjusted under 35 U.S.C. 154(b) by 0 days.

(21) Appl. No.: 14/205,273

(22) Filed: Mar. 11, 2014

(65) Prior Publication Data

US 2014/0258668 A1 Sep. 11, 2014

Related U.S. Application Data

(60) Provisional application No. 61/776,438, filed on Mar. 11, 2013.

(51) Int. Cl.
*G06F 3/00* (2006.01)
*G06F 13/28* (2006.01)
*G06F 5/00* (2006.01)
*G06F 3/06* (2006.01)

(52) U.S. Cl.
CPC .............. *G06F 3/0647* (2013.01); *G06F 3/068* (2013.01); *G06F 3/0613* (2013.01); *G06F 3/0685* (2013.01)

(58) Field of Classification Search
CPC ...... G06F 3/068; G06F 3/0685; G06F 11/076
USPC ................... 710/1, 6, 11, 25, 29, 60; 711/103
See application file for complete search history.

(56) References Cited

U.S. PATENT DOCUMENTS

| 6,304,925 | B1 * | 10/2001 | Liu et al. ........................... 710/62 |
| 7,464,240 | B2 | 12/2008 | Caulkins et al. |
| 7,792,882 | B2 | 9/2010 | Moore et al. |
| 8,380,952 | B2 | 2/2013 | Watanabe |
| 2005/0050268 | A1 | 3/2005 | Yoshisa |
| 2005/0097268 | A1 * | 5/2005 | Vollmer ......................... 711/113 |

(Continued)

OTHER PUBLICATIONS

International Search Report and Written Opinion of the International Searching Authority for copending Int'l App. No. PCT/US14/23802.

*Primary Examiner* — Idriss N Alrobaye
*Assistant Examiner* — Getente A Yimer
(74) *Attorney, Agent, or Firm* — Scherrer Patent & Trademark Law, P.C.; Stephen T. Scherrer; Monique A. Morneault

(57) ABSTRACT

The present invention relates to systems and methods for managing storage space in hybrid data storage systems. Specifically, the systems and methods of the present invention intelligently allocate data to solid state drives or other relatively high performance drives, and other data storage, such as, for example, hard drives or other like drives, based on data source, data type, data function or other like parameters. The intelligent allocation between at least one solid state drive, or other relatively high performance drive, and at least one other drive type allows for greater system performance through efficient use storage space. Specifically, the present invention adaptively uses the fastest necessary connected storage options in a hybrid data storage set to maintain maximum performance while most efficiently using minimum rewrites of data. Moreover, the allocation of data to storage in a hybrid data storage system may be controlled automatically or may be specifically set by a user thereof.

14 Claims, 1 Drawing Sheet

(56) References Cited

U.S. PATENT DOCUMENTS

2008/0140883 A1* 6/2008 Salessi et al. .................. 710/52
2008/0140919 A1* 6/2008 Torabi et al. .................. 711/103
2009/0265506 A1* 10/2009 Yim .............................. 711/103
2010/0205365 A1* 8/2010 Huang et al. .................. 711/111
2011/0283035 A1 11/2011 Sutardja et al.

* cited by examiner

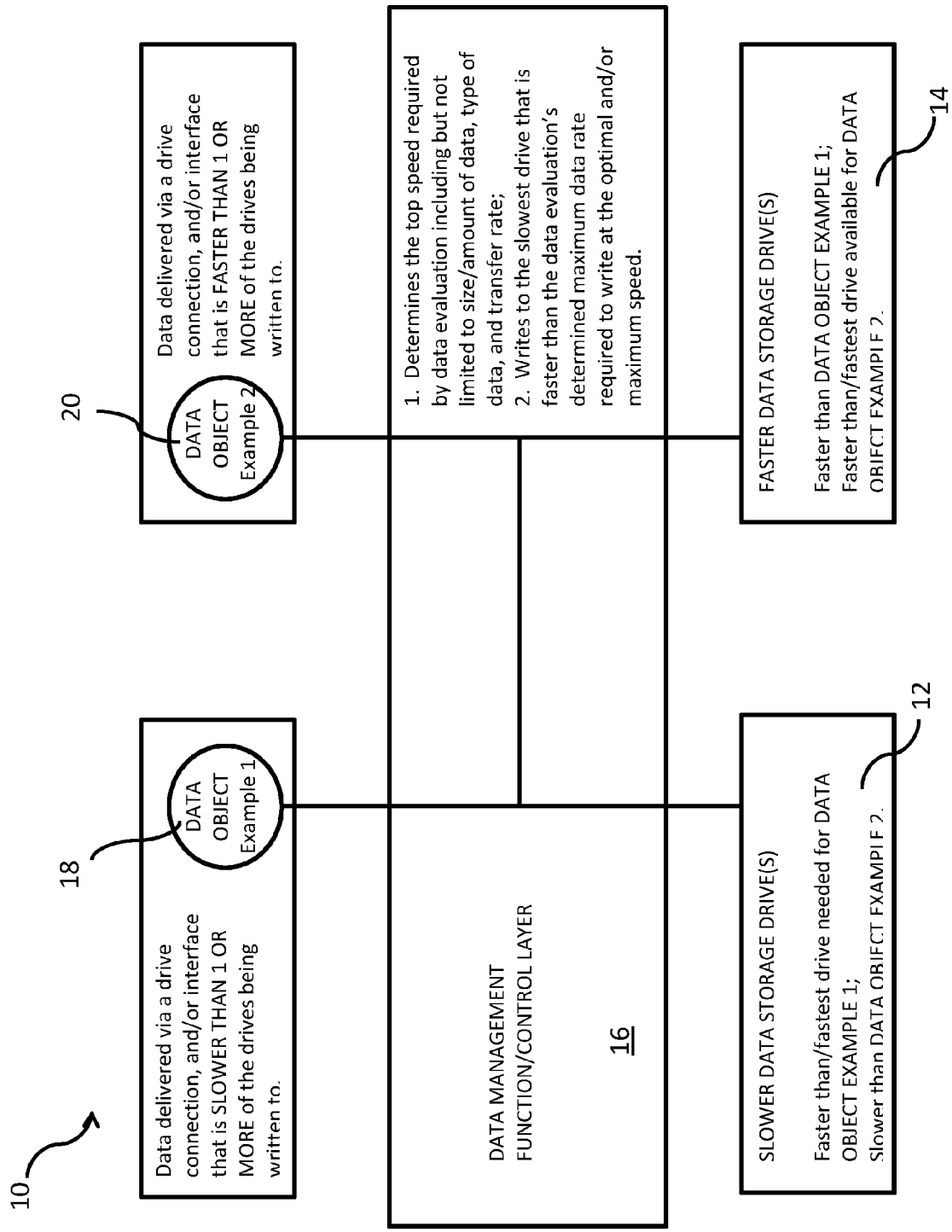

SYSTEMS AND METHODS FOR MANAGING STORAGE SPACE IN HYBRID DATA STORAGE SYSTEMS

The present invention claims priority under 35 U.S.C. 119 to U.S. Provisional Patent Application No. 61/776,438, titled "Systems and Methods for Managing Storage Space in Hybrid Data Storage Systems," filed Mar. 11, 2013, which is expressly incorporated herein by reference in its entirety.

TECHNICAL FIELD

The present invention relates to systems and methods for managing storage space in hybrid data storage systems. Specifically, the systems and methods of the present invention intelligently allocate data to solid state drives, or other relatively high performance data storage drive, and other data storage systems, such as, for example, hard drives, based on data source, data type and/or data function. The intelligent allocation between at least one solid state drive, or other relatively high performance data storage drive, and at least one other drive type allows for greater system performance through efficient use of hard drive, optical drive, solid state and other data storage types, known now or in the future. Specifically, the present invention adaptively uses the fastest necessary connected storage options in a hybrid data storage set to maintain maximum performance levels while most efficiently using minimum rewrites of data. Moreover, the allocation of data to memory in a hybrid data storage system may be controlled automatically or may be specifically set by a user thereof.

BACKGROUND

It is, of course, generally known to utilize hybrid data storage systems in computers. Specifically, it is common to employ the usage of hard disk drives ("HDD") for storage of data. A hard drive consists of a spinning disk coated with magnetic material that may be manipulated to store data thereon. Data may further be read from the disk, typically via magnetic heads on actuators that may move to retrieve any data at any location of the disk. Hard drives are extremely advantageous due to their relatively low cost, simplicity, high storage capacity and relatively fast read/write capabilities.

Specifically, today's hard drives can support data rates in excess of 150 MB/s but are limited in their inputs/outputs (I/O) per second. Moreover, a hard drive can perform large data read and write functions at a data rate near its peak. For example, loading a video, music file, photo, video capture, backup image or other like large, contiguous file, may be read and written to a hard drive at a rate near the peak of the drive.

However, hard drives suffer certain disadvantages, including limitations in their storage capacity, size and the speed of their read/write capabilities. While capacity of hard drives is increasing, the size of disks within the hard drives generally limits the capacities. Specifically, size is often limited because reducing the size of the disks directly impacts the area of recordable space on the disks. Moreover, disks are limited in read/write capabilities by the speed of rotation of the disks. Typical hard drives rotate at 7200 rpm, which typically limits the speed of reading data from and writing data to the disks. Of course, disks may rotate at higher speeds, but this may also increase the cost of production. Therefore, it is difficult to increase capacity of hard drives while decreasing size and it is also difficult to increase speed without increasing cost.

More specifically, a hard drive can perform small read/write functions at data rates of only up to its maximum I/O rates. With today's hard drives typically able to perform less than 500 I/Os per second at best, this results in data rates of about 2 MB/s for functions such as database Read and Writes, memory paging functions small file calls that applications may make, processor/operating system caching functions, small file transfers, and other like functions. While the hard drive I/O rates have improved over the years, the rate of improvement is limited by the mechanical nature of the hard drive with respect to rotational speed, as previously noted, head travel distance, and media density.

The main competition for providing storage space in a computing system is a solid state drive ("SSD"). An SSD is a data storage device that uses integrated circuit assemblies as memory to store data persistently. SSD technology uses electronic interfaces compatible with traditional block input/output (I/O) hard disk drive, but do not employ any moving mechanical components, which distinguish them from traditional magnetic disks such as HDDs. Compared with electromechanical disks, SSDs are typically less susceptible to physical shock, are much quieter, and have lower access time and latency. However, while the price of SSDs has continued to decline, SSDs are still presently about 10 times more expensive per unit of storage than HDDs.

More specifically, an SSD may maintain the same operations as an HDD at a far greater I/O rate capability, typically sustaining data rates up to 100 times faster than the same on an HDD. Moreover, SSDs typically read and write at their peak data rates, but the limiting factor for SSDs tends to be the source generating the data, or the function of the data utilized from the drive.

Many modern computer systems utilize a hybrid storage solution, typically using SDDs and other types of storage drives, typically HDDs, together to achieve many of the benefits of SDDs, while keeping costs relatively low in comparison to using only SDDs for data storage. However, it is often difficult to efficiently allocate the data to one or the other of the drives in a hybrid storage system. In many cases, it is far better to allocate certain data to either the SSD or to the other drive, such as an HDD, depending on the type of data, the source of the data, or the functionality of the data.

Specifically, data is typically cached first to an SSD and then allocated to an HDD, even if the source of the data is the limiting factor. For example, copying an image from a DVD, CD, or a Blu-Ray to a computer via USB3.0/2.0, even with the fastest optical drives, is well below the data rate capability of a either an HDD or a SSD. However, in typical hybrid storage systems, the data is still written to the SSD first and then transferred to the HDD.

Moreover, in hybrid storage solutions, data may typically be written to an SSD on a "most-used" basis. For example, playing the same video file over and over again typically results in the that file to be cached on the SSD in a hybrid system, even though there is typically no real-world performance benefit for that file to be in the SSD space.

Still further, while SSDs may support nearly unlimited reads, long-term reliability is limited by the number of writes that are performed thereon. Thus, typical hybrid systems may require relatively frequent replacement of SSDs due to over-use of writing data thereto, especially when not needed in a particular data transfer. And as hard drives become faster, utilizing hard drive capability over SSD capability may allow further extending of SSD lifespans, as more and more write functions may be allocated directly to the HDDs instead of to SSDs in a hybrid storage system.

A need exists, therefore, for systems and methods for managing storage space in hybrid data storage systems. Specifically, a need exists for systems and methods for efficiently allocating data between a solid state drive and a second drive, such as a hard disk drive.

Moreover, a need exists for systems and methods to choose between storage on a SSD drive and a second drive, such as an HDD, based on factors that may increase the speed of data transfer or, if speed is limited by source, allocate data to storage in such a way as to preserve higher capable drives for suitable data. In addition, a need exists for systems and methods that select storage between an SSD and a second drive, such as an HDD, based on data type, data source and/or data functionality.

Further, a need exists for systems and methods allowing users to determine the desired allocation of data between an SSD and a second drive, such as an HDD, in a hybrid storage system. Still further, a need exists for systems and methods that aid in extending usable lifespan of hybrid storage systems by minimizing writing to SSDs.

SUMMARY OF THE INVENTION

The present invention relates to systems and methods for managing storage space in hybrid data storage systems. Specifically, the systems and methods of the present invention intelligently allocate data to solid state drives and other memory storage systems, such as, for example, hard drives, based on data source, data type and/or data function. The intelligent allocation between at least one solid state drive or other relatively high performance data storage type and at least one other data storage type allows for greater system performance through efficient use of data storage types. Specifically, the present invention adaptively uses the fastest necessary connected storage options in a hybrid data storage set to maintain maximum performance while most efficiently using minimum rewrites of data. Moreover, the allocation of data to available storage in a hybrid data storage system may be controlled automatically or may be specifically set by a user thereof.

To this end, in an embodiment of the present invention, a system is provided, the system comprising a computing device comprising a hybrid data storage system comprising a first storage drive (or plurality of drives) and a second storage drive (or plurality of drives), the first storage drive having a data transfer rate slower than the second storage drive; and a data management control layer to control the storage of data to one of the first drive and the second drive based on speed limitations of the data transfer to the first and second drives.

It is, therefore, an advantage and objective of the present invention to provide systems and methods for managing storage space in hybrid data storage systems.

Specifically, it is an advantage and objective of the present invention to provide systems and methods for efficiently allocating data between, for example, a solid state drive and a second drive, such as a hard disk drive.

Moreover, it is an advantage and objective of the present invention to provide systems and methods to choose between storage on a SSD drive and a second drive, such as an HDD, based on factors that may increase the speed of data transfer or, if speed is limited by source, allocate data to storage in such a way as to preserve higher capable drives for suitable data.

In addition, it is an advantage and objective of the present invention to provide systems and methods that select storage between an SSD and a second drive, such as an HDD, based on data type, data source and/or data functionality.

Further, it is an advantage and objective of the present invention to provide systems and methods allowing users to determine the desired allocation of data between an SSD and a second drive, such as an HDD, in a hybrid storage system.

Still further, it is an advantage and objective of the present invention to provide systems and methods that aid in extending usable lifespan of hybrid storage systems by minimizing writing to SSDs.

Additional features and advantages of the present invention are described in, and will be apparent from, the detailed description of the presently preferred embodiments and from the drawings.

BRIEF DESCRIPTION OF THE DRAWINGS

The drawing FIGURE depict one or more implementations in accord with the present concepts, by way of example only, not by way of limitations. In the FIGURE, like reference numerals refer to the same or similar elements.

FIG. 1 illustrates an overview of a system and method showing allocation of data to a first data storage or a second data storage in a hybrid data storage system in an embodiment of the present invention.

DETAILED DESCRIPTION OF THE PRESENTLY PREFERRED EMBODIMENTS

The present invention relates to systems and methods for managing storage space in hybrid data storage systems. Specifically, the systems and methods of the present invention intelligently allocate data to solid state drives, or other relatively high performance storage drive and other data storage systems, such as, for example, hard drives, based on data source, data type and/or data function. The intelligent allocation between at least one solid state drive, or other high performance drive, and at least one other drive type allows for greater system performance through efficient use of storage space. Specifically, the present invention adaptively uses the fastest necessary connected storage options in a hybrid data storage set to maintain maximum performance while most efficiently using minimum rewrites of data. Moreover, the allocation of data to memory in a hybrid data storage system may be controlled automatically or may be specifically set by a user thereof.

For purposes of the present invention, use of the term "data storage", "drive" or other like terminology refers to any data storage means, whether known now or in the future, and the invention should not be limited as described herein.

In known hybrid data storage systems, such as in an SSD/HDD hybrid data storage system, it is typical for data to be cached in the SSD prior to being permanently and persistently stored in either the HDD or maintained in the SSD, based on the data type or function thereof. The present invention may intelligently determine, either automatically via presets or via user entered specifications, the proper drive to write data, based on one or a plurality of factors, detailed below. Thus, the present invention maintains the maximum possible performance while minimizing re-writes of data, especially on SSDs, which may be subject to wear from significant data writing.

Now referring to the FIGURE, wherein like numerals refer to like parts, FIG. 1 illustrates an overview 10 of a system and method of the present invention. In an embodiment of the present invention, a computer system is provided having a hybrid storage system. A hybrid storage system is a storage system for a computing device that includes at least two storage caches, each of the storage caches having different data transfer speeds. FIG. 1 illustrates a "Slower Data Storage Drive" ("first drive 12") and a "Faster Data Storage Drive" ("second drive 14"). It should be noted that each drive 12, 14 may include a plurality of disks or data storage means that may be grouped together to form a single "drive". For example, the "Slower Data Storage Drive" 12 may be a hard disk drive that may contain a plurality of hard disks for data storage, the plurality of hard disks working in concert to present a single drive.

In a preferred embodiment, a first storage cache is a solid state drive. In a more preferred embodiment, the first drive 12 is a hard disk drive and the second drive 14 is a solid state drive. In an embodiment, the first drive 12 has a first write speed, and the second drive 14 has a second write speed, wherein the first write speed is slower than the second write speed. It should be noted, however, the present invention may be utilized in any system having two or more storage caches having different data transfer speeds, no matter the type of storage cache. Thus, the present invention may relate to a storage system having two hard disk drives, each having different data transfer speeds and even two solid state drives, each having different data transfer speeds.

The present invention further includes a data management/control layer 16 that may be utilized to determine how to effective allocate the data to the first drive 12 or to the second drive 14. In a preferred embodiment, the data management/control layer 16 may be set to most efficiently and effectively utilize the first and second drives 12, 14 for optimal efficiency, minimizing writing to the faster second drive 14 if the data transfer is limited by other factors, thereby preserving usage of the second drive 14 for writing data thereto when, either automatically by the data management/control layer 16 or by user preferences.

The data management/control layer may be implemented via software, such as embedded within the operating system of the computing device with a storage device interface or on the hybrid storage system itself, or may be implemented within hardware, such as integrated on a chip or other device independently of the operating system.

The data management/control layer 16 may first determine the top speed required by evaluating the data to be written to the first drive 12 or the second drive 14. Specifically, the data management/control layer 16 may determine the top speed available for data transfer based on one or more of a plurality of factors, including the size and/or amount of data to be written, the type of data to be written, and the transfer rate, connection speed and/or connection type. Once the data management/control layer 16 determines the top speed required for data transfer, the data management/control layer 16 may effectively allocate the data to the first drive 12 or the second drive 14, as necessary. For example, the data management/control layer 16 may write to the slowest drive that is faster than the top speed available for data transfer.

For example, as illustrated in FIG. 1, a first data object 18 and a second data object 20 are illustrated. The first and second data objects 18 may be any data that may be utilized to perform a function on a computing device, such as an application, a media file, such as a photograph, music file, video file, or other like media file, or any other data apparent to one of ordinary skill in the art. Thus, the data may be written to a drive and read from a drive as a block for utilization as needed by the computing device. For the present example illustrated in FIG. 1, the first and second data objects 18, 20 may be identical, but may be transferred from different sources. Specifically, the first data object 18 may be transferred from a drive, a connection, and/or an interface that is slower than either or both of the first and second drives 12, 14. The second data object 20 may be transferred from a drive, a connection, and/or an interface that is faster than at least one of the first and second drives 12, 14.

In a first example, first data object 18 may thus be written to the first drive 12, which has a slower write speed than the second drive 14. Thus, usage of the second drive 14, being faster than the first drive 12, may be preserved. Thus, the first drive 12 may be allocated for storage of the first data object 18, because the write speed will be the same whether the first data object 18 is written to the first drive 12 or the second drive 14. In other words, there is no benefit to using the second drive 14 for storage of the first data object 18 because the source of the data, whether by the source drive, connection and/or interface, limits the write speed, and not the destination drive.

In a second example, second data object 20 may be written to the faster, second drive 14, which has a faster write speed than the first drive 12. Thus, usage of the second drive 14 allows for faster write speeds than had the first drive 12 been utilized, promoting efficient usage of the faster drive, when necessary. The second drive 14 may be allocated for storage of the second data object 20, because, if the slower, first drive 12 was used for storage thereof, the write speed of the second data object 20 would be limited by the first drive 12 itself. Therefore, to promote efficient use of the system drives, the second drive 14 may be allocated for storage thereof.

It should be noted that the present invention may utilize more than two drives, each of the drives having different speeds. In such a case, the present invention may utilize the specified evaluation to determine how best to allocate data to the plurality of drives. In general, and in a preferred embodiment of the present invention, the data may be written to the slowest drive available that is faster than the top speed available for data transfer of the data. Thus, the most efficient usage of drives may be utilized.

Of course, while it may generally be desired that the data may be written to a drive based on limiting data transfer rates, the present invention may allocate to various drives in hybrid storage system based on other decision factors. For example, the data management/control layer 16 may determine whether the process that utilizes the storage file type is able to utilize or load any called data at a rate that is faster than the ability of the slowest drive to read the data. If yes, then it may be desired to have the data stored on the faster drive so that the drive does not limit the read rate of the data, or the user may wish for to have the data transferred to the faster drive for optimal retrieval thereof. If no, then it may be desired to preserve the usage of the faster drive and store the data on the slower drive.

Other limiting factors may also play a role in determining on which drive is best to store data in a hybrid data storage system. For example, if the hybrid storage system is on an interface that exceeds the capability of the slower drive interface and/or capability, and if data type/data transfer block size of the data is of a type that exceeds the I/O capability of the slower drive, then it may be desired to have the data written to the faster drive. However, if the hybrid storage system is on an interface that does not exceed the capability of the slower drive interface and/or capability, and if the data type/data transfer block size is of a type that does not exceed the I/O capability of the slower drive, then it may be desired to have the data written to the slower drive.

In another example, if the interface of the source data input is faster than the hard drive capability, but the data type and/or data transfer block size is of a type that does not exceed the I/O capability of the slower drive, then the user may wish to write the data to the slower drive, thereby preserving the usage of the faster drive. If yes, then efficient allocation of the drives may dictate that the data be written to the faster drive.

In another embodiment of the present invention, the data management/control layer 16 may include a default setting, whereby data allocation is subject to the rules specified, such as the rules described herein. However, the data management/control layer 16 may include a user interface, whereby a user of the computer system may define how best to allocate data storage among a plurality of drives having different data transfer rates. For example, the user may define whether to allocate based on specific file types, application usage, interface source, or the like, whether to store the data on the faster drive or the slower drive in a hybrid storage system.

Moreover, the user may be allowed to set thresholds of performance. For example, if an HDD is able to provide a certain defined percentage of performance, then the HDD should be utilized to store data and not the SSD. For example, a user may select to only cache functions where an HDD was 80% of the SSD performance with a particular data type or function. Alternatively, the SSD may be limited to only be used for data that offers the greatest benefits.

The utilization of the present invention may generally provide overall greater system performance through efficient usage of the available storage space, such as available SSD space. By adding the additional intelligence, end user control, and algorithmic determination selecting by data functions, data types, data block size transfers, interface sources, and other performance variables, the usage of storage space may be adequately and efficiently allocated. Thus, if the hybrid storage system utilizes an HDD and an SSD, then the present invention may generally be utilized to determine when to use the SSD and when to bypass usage of the SSD and write to the HDD or other storage. The result is a smaller SSD cache space that can provide greater overall system performance. Moreover, fewer writes may overall be performed on the SSD, improving the SSD's usable lifespan.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A system for managing storage space in a hybrid data storage apparatus comprising:
   a computing device comprising a hybrid data storage system comprising a first storage drive and a second storage drive, the first storage drive having a data transfer rate slower than the second storage drive;
   a data management controller to control the storage of data from a source to one of the first storage drive and the second storage drive based on speed limitations of the data transfer of the data; and
   a first data object from a first data source for transferring to the first or the second storage drive,
   wherein the data management controller determines the maximum rate of transfer of the first data object to the first storage drive or the second storage drive and further transfers the first data object to the first storage drive if the maximum rate of transfer of the first data object from the first data source is slower than the data transfer rate of the first storage drive and further transfers the first data object to the second storage drive if the maximum rate of transfer of the first data object from the first data source is faster than the data transfer rate of the first storage drive.

2. A method for managing storage space in a hybrid data storage apparatus comprising the steps of:
   providing a computing device comprising a hybrid data storage system comprising a first storage drive and a second storage drive, the first storage drive having a data transfer rate slower than the second storage drive;
   providing a data management controller;
   providing a first data object at a first data source;
   determining a maximum data transfer rate of the first data object from the first data source to the first storage drive or the second storage drive;
   transferring the first data object to the first storage drive if the maximum data transfer rate of the first data object from the first data source is slower than the data transfer rate of the first storage drive, and transferring the first data object to the second storage drive if the maximum data transfer rate of the first data object from the first data source is faster than the data transfer rate of the first storage drive.

3. The system of claim 1 wherein the data transfer rate of the first data object from the first data source has speed limitations, wherein the speed limitations of the data transfer of the first data object from the first data source is caused by a parameter selected from the group consisting of file type, data transfer block size, application for using the data, and combinations thereof.

4. The system of claim 1 wherein the data management controller compares the data transfer rate of the data from the source to the data transfer rates of at least the first storage drive.

5. The system of claim 1 wherein the data transfer rate of the first storage drive is a first write speed of the first storage drive and the data transfer rate of the second storage drive is a second write speed of the second storage drive.

6. The system of claim 1 wherein the data management controller determines the application on the computing device for using the first data object and determines the load rate of the first data object to the application from at least the first storage drive.

7. The system of claim 6 wherein the data management controller transfers the first data object to the first storage drive if the load rate of the first data object to the application is slower than the data transfer rate from the first storage drive.

8. The system of claim 6 wherein the data management controller transfers the first data object to the second storage drive if the load rate of the first data object to the application is faster than the data transfer rate from the first storage drive.

9. The method of claim 2 wherein the data transfer rate of the first data object from the first data source has speed limitations, wherein the speed limitations of the data transfer of the first data object from the first data source is caused by a parameter selected from the group consisting of file type, data transfer block size, application for using the data, and combinations thereof.

10. The method of claim 2 further comprising the step of:
    comparing, via the data management controller, the maximum data transfer rate of the first data object from the first data source to the data transfer rate of at least the first storage drive.

11. The method of claim 2 wherein the data transfer rate of the first storage drive is a first write speed of the first storage drive and the data transfer rate of the second storage drive is a second write speed of the second storage drive.

12. The method of claim 2 further comprising the step of:
    determining, via the data management controller, an application on the computing device for using the first data object; and determining, via the data management controller, the load rate of the first data object to the application from at least the first storage drive.

13. The method of claim 12 further comprising the step of:
transferring, via the data management controller, the first data object to the first storage drive if the load rate of the first data object to the application is slower than the data transfer rate from the first storage drive.

14. The method of claim 12 further comprising the step of:
transferring, via the data management controller, the first data object to the second storage drive if the load rate of the first data object to the application is faster than the data transfer rate from the first storage drive.

\* \* \* \* \*